US006970284B1

(12) United States Patent
Kim et al.

(10) Patent No.: US 6,970,284 B1
(45) Date of Patent: Nov. 29, 2005

(54) VARIABLE FOCUSING LENS COMPRISING MICROMIRRORS WITH ONE DEGREE OF FREEDOM ROTATION

(75) Inventors: Tae Hyeon Kim, Taejeon (KR); Sang Hyune Baek, Suwon (KR)

(73) Assignees: Angstrom Inc., Suwon (KR); Stereo Display Inc., Fullerton ( * ) Notice: Subject to any disclaimer, the term of this patent is extended or adjusted under 35 U.S.C. 154(b) by 0 days.

(21) Appl. No.: 10/855,554

(22) Filed: May 27, 2004

(51) Int. Cl.[7] ............................................. G02B 26/00
(52) U.S. Cl. ........................ 359/291; 359/298; 359/846
(58) Field of Search ................................ 359/291, 290, 359/846, 224, 230, 298, 676, 683, 694

(56) References Cited

U.S. PATENT DOCUMENTS

| 2,002,376 | A | | 5/1935 | Manfred |
| 4,834,512 | A | | 5/1989 | Austin |
| 5,986,811 | A | | 11/1999 | Wohlstadter |
| 6,111,900 | A | | 8/2000 | Suzudo |
| 6,498,673 | B1 | * | 12/2002 | Frigo et al. ................. 359/246 |
| 2002/0102102 | A1 | | 8/2002 | Watanabe et al. |

OTHER PUBLICATIONS

Kaneko et al., 2000, "Quick Response Dynamic Focusing Lens using Multi-Layered Piezoelectric Bimorph Actuator," Proceeding of SPIE vol. 4075: 24-31.

Cho, 2003, "Fast-response Variable Focusing Micromirror Array Lens," Proceeding of SPIE vol. 5055: 278-286.

* cited by examiner

Primary Examiner—Scott J. Sugarman
Assistant Examiner—Richard Hanig
(74) Attorney, Agent, or Firm—Park & Sutton LLP; John K. Park

(57) ABSTRACT

A variable focal length lens comprising micromirrors with one degree of freedom rotation is invented. The lens consists of many micromirrors and actuating components. The array of micromirrors with one degree of freedom rotation makes all lights scattered from one point of an object converge at one point of image plane by using rotation of micromirror. The micromirror has the same function as a mirror. Therefore, the reflective surface of the micromirror is made of metal, metal compound, multi-layered dielectric material, or other materials with high reflectivity. The actuating components control the rotational displacements of micromirrors electrostatically and/or electromagnetically. The optical efficiency of the micromirror array lens is increased by locating a mechanical structure upholding micromirrors and the actuating components under micromirrors. The known CMOS technologies can remove the loss in effective reflective area due to electrode pads and wires.

22 Claims, 2 Drawing Sheets

VARIABLE FOCUSING LENS COMPRISING MICROMIRRORS WITH ONE DEGREE OF FREEDOM ROTATION

BACKGROUND OF THE INVENTION

The present invention relates to a variable focal length lens comprising micromirrors with one degree of freedom (DOF) rotation and operational methods for the lens.

A most widely used conventional variable focal length system is the one using two refractive lenses. It has complex driving mechanisms to control the relative positions of refractive lenses and a slow response time. Alternatively, variable focal length lenses have been made. Variable focal length lenses can be made by changing the shape of the lens, as is found in the human eye; this method has been used in lenses made with isotropic liquids. Other lenses have been made of electrically variable refractive index media to create either a conventional lens or a gradient index lens by means of a voltage gradient. The electrically variable refractive index allows the focal length of the lenses to be voltage controlled. Among them, the most advanced variable focal length lens is a liquid crystal variable focal length lens, which has a complex mechanism to control the focal length. Its focal length is changed by modulating the refractive index. Unfortunately, it has a slow response time typically on the order of hundreds of milliseconds. Even though the fastest response liquid crystal lens has the response time of tens of milliseconds, it has small focal length variation and low focusing efficiency.

To solve the disadvantages of the conventional focal length lens, a fast-response micromirror array lens was proposed. The details of the fast-response micromirror array lens are described in J. Boyd and G. Cho, 2003, "Fast-response Variable Focusing Micromirror Array Lens," *Proceeding of SPIE* Vol. 5055: 278–286. The paper is incorporated by reference into this disclosure as if fully set forth herein. The conventional micromirror array lens mainly consists of micromirrors and actuating components. The focal length of the conventional micromirror array lens is varied by both one DOF translation and one DOF rotation of each micromirror. The micromirror with both one DOF translation and one DOF rotation has a complex mechanical structure, actuating components and coupled motion. Therefore, fabrication, accurate control, and large motions of the micromirror are difficult. To be applied more easily and widely, a micromirror array lens with much simple mechanical structure and actuating components is necessary. Therefore, a micromirror array lens comprising micromirrors with only one DOF rotation is invented.

SUMMARY OF THE INVENTION

The present invention contrives to solve the disadvantages of the conventional variable focal length lens.

The objective of the invention is to improve the design and control of the conventional micromirror array lens.

Conventional micromirror array lens is described in J. Boyd and G. Cho, 2003, "Fast-response Variable Focusing Micromirror Array Lens," *Proceeding of SPIE* Vol. 5055: 278–286. The invention works as a variable focal length lens, and consists of many micromirrors to reflect the light and actuating components to control positions of the micromirrors. Each micromirror has the same function as a mirror. By making all lights scattered from one point of an object have the same periodical phase and converge at one point of image plane, the conventional micromirror array works as a reflective focal length lens. In order to do this, the micromirrors were electrostatically controlled to have desired positions by actuating components. A diffraction-limited micromirror array lens is formed by controlling both one degree of freedom (DOF) translation and one degree of freedom (DOF) rotation of each micromirror. The micromirror with both one DOF translation and one DOF rotation has a complex mechanical structure, actuating components and coupled motion. Therefore, fabrication, accurate control, and large motions of the micromirror are difficult. A micromirror array lens with one DOF rotation of micromirrors has a much simple mechanical structure and actuating components. The micromirror array lens formed by the control of one DOF rotation has relatively larger aberration because the same phase condition is not satisfied. Even though the quality of the lens formed by control of one DOF rotation is lower than the lens formed by control of both one DOF rotation and one DOF translation, it can be used as a variable focal length lens such as an imaging lens with low quality or focusing lens because of advantages that its structure and control is much simpler than those of the lens with both one DOF rotation and one DOF translation.

The micromirror array lens can be formed by a polar array of the micromirrors. For the polar array, each micromirror has a fan shape to increase an effective reflective area, so that the optical efficiency increases. The optical efficiency of the micromirror array lens can be improved by locating a mechanical structure upholding micromirrors and the actuating components under micromirrors to increase an effective reflective area. Electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires.

The micromirrors are arranged to form one or more concentric circles to form the axisymmetric lens and the micromirrors on the same concentric circle can be controlled by the same electrodes with concentric circle shape or controlled by know semiconductor microelectronics technologies such as MOS or CMOS independently.

It is desired that each of the micromirrors has a curvature because the ideal shape of a conventional reflective lens has a curvature. If the size of the flat micromirror is small enough, the aberration of the lens comprising flat micromirrors is also small enough. In this case, the micromirror does not need a curvature.

The advantages of the present invention are: (1) the micromirror array lens has a very fast response time because each micromirror has a tiny mass; (2) the lens has a high optical focusing efficiency; (3) the lens can have a large size aperture without losing optical performance. Because the micromirror array lens consists of discrete micromirrors, the increase in the size of the lens does not cause the increase in aberration caused by shape error of a lens; (4) the lens is cost effective because of the advantages of its mass productivity; (6) the lens has simple structure and control.

Although the present invention is briefly summarized, the full understanding of the invention can be obtained by the following drawings, detailed description, and appended claims.

DESCRIPTION OF THE FIGURES

These and other features, aspects and advantages of the present invention will become better understood with references to the accompanying drawings, wherein.

DETAILED DESCRIPTION OF THE INVENTION

Figure 1:
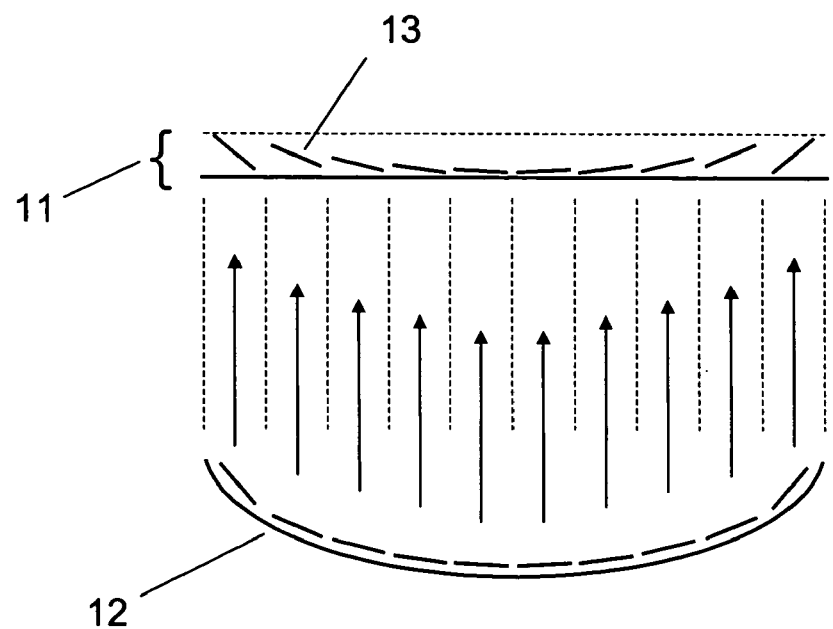
FIG. 1 is a schematic diagram showing the cut-away side view of a conventional micromirror array lens.

FIG. 1 illustrates the principle of the conventional micromirror array lens 11. There are two conditions to make a perfect lens. The first is the converging condition that all lights scattered by one point of an object should converge into one point of the image plane. The second is the same phase condition that all converging light should have the same phase at the image plane. To satisfy the perfect lens conditions, the surface shape of conventional reflective lens 12 is formed to have all lights scattered by one point of an objective to be converged into one point of the image plane and have the optical path length of all converging light to be same.

A micromirror array arranged in flat plane can satisfy two conditions to be a lens. Each of the micromirrors 13 rotates to converge the scattered light. Because all micromirrors 13 of the conventional micromirror array lens 11 are arranged in a flat plane as shown in FIG. 1, the optical path length of lights converged by one DOF rotation of each micromirror is different. Even though the optical path length of converging light is different, the same phase condition can be satisfied with adjusting the phase because the phase of light is periodic.

Figure 2:
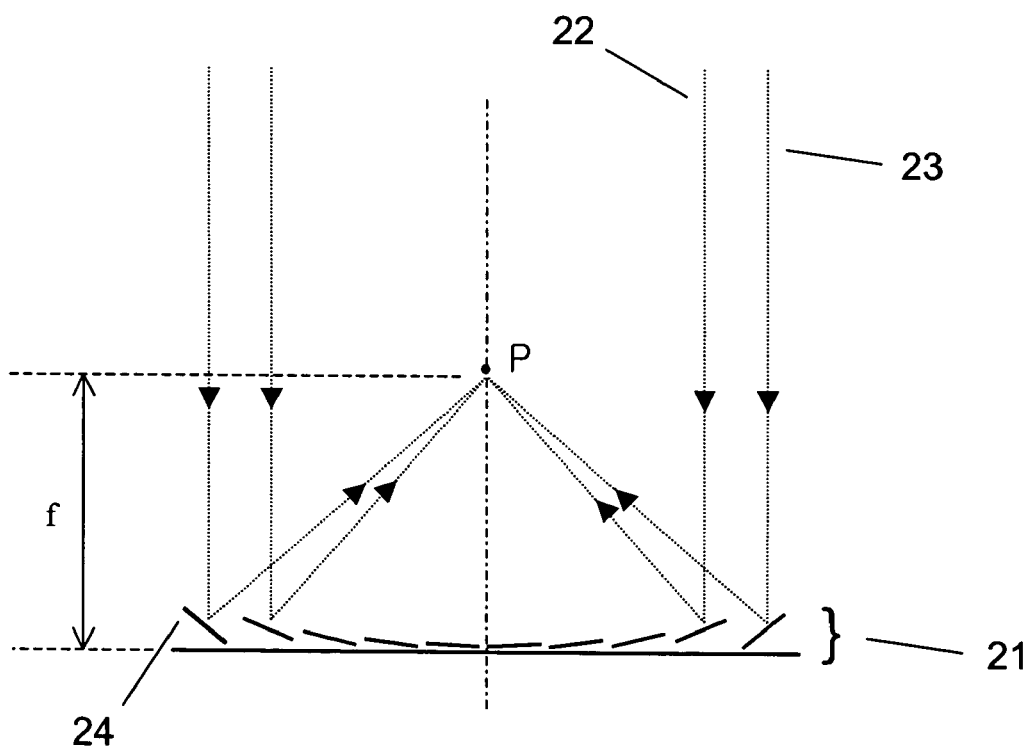
FIG. 2 is a schematic diagram showing how the micromirror array lens comprising micromirrors with only one DOF rotation works as a lens.

FIG. 2 illustrates how the micromirror array lens 21 comprising micromirrors with one DOF rotation images. Arbitrary scattered lights 22, 23 are converged into one point P of the image plane by controlling the positions of the micromirrors 24. The phases of arbitrary lights 22, 23 are not adjusted to satisfy same phase condition. Even though the phase condition is not satisfied, low quality imaging or focusing is still possible.

Figure 3:
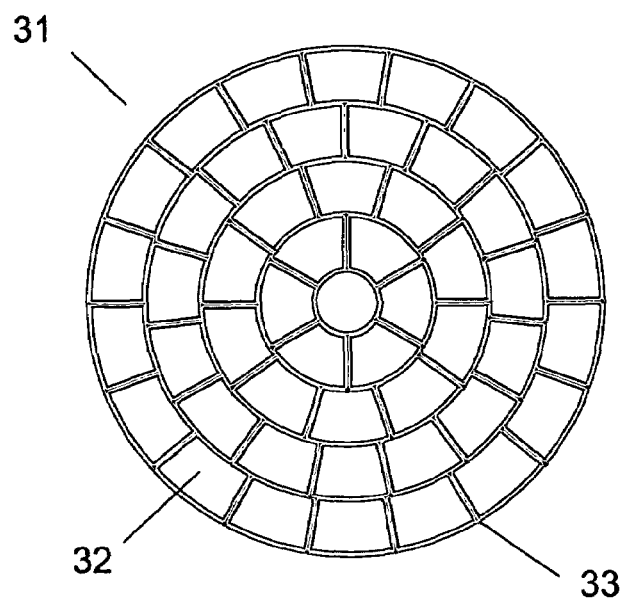
FIG. 3 is an in-plane schematic view showing a circular micromirror array lens comprising micromirrors with one DOF rotation and actuating components.

FIG. 3 illustrates the in-plane view of a circular micromirror array lens 31 comprising micromirrors with one DOF rotation. The micromirror 32 has the same function as a mirror. Therefore, the reflective surface of the micromirror is made of metal, metal compound, multi-layered dielectric material, or other materials with high reflectivity. Many known microfabrication processes can make the surface with high reflectivity. Each micromirror 32 is electrostatically and/or electromagnetically controlled by the actuating components 33 as known. Because a circular lens is an axisymmetric, the micromirror array lens 31 has a polar array of the micromirrors 32. Each of the micromirrors 32 has a fan shape to increase an effective reflective area, which increases optical efficiency. All micromirrors are arranged in a flat plane because they are fabricated by known microfabrication processes. The micromirrors are arranged to form one or more concentric circles to form the axisymmetric lens and the micromirrors on the same concentric circle can be controlled by the same electrodes with concentric circle shape or controlled by known semiconductor microelectronics technologies such as MOS or CMOS independently.

It is desired that each of the micromirrors 32 has a curvature because the ideal shape of a conventional reflective lens 12 has a curvature. According to focal length change of the lens, the curvature of micromirror should be controlled. The curvature of the micromirror is controlled by electrothermal or electrostatic force. If the size of the flat micromirror is small enough, the aberration of the lens comprising flat micromirrors 32 is also small enough. In this case, the micromirror does not need a curvature.

The mechanical structure upholding each reflective micromirror 32 and the actuating components 33 are located under the micromirrors 32 to increase the effective reflective area. Also, electric circuits to operate the micromirrors can be replaced with known semiconductor microelectronics technologies such as MOS and CMOS. Applying the microelectronics circuits under micromirror array, the effective reflective area can be increased by removing necessary area for electrode pads and wires used to supply actuating power.

Figure 4:
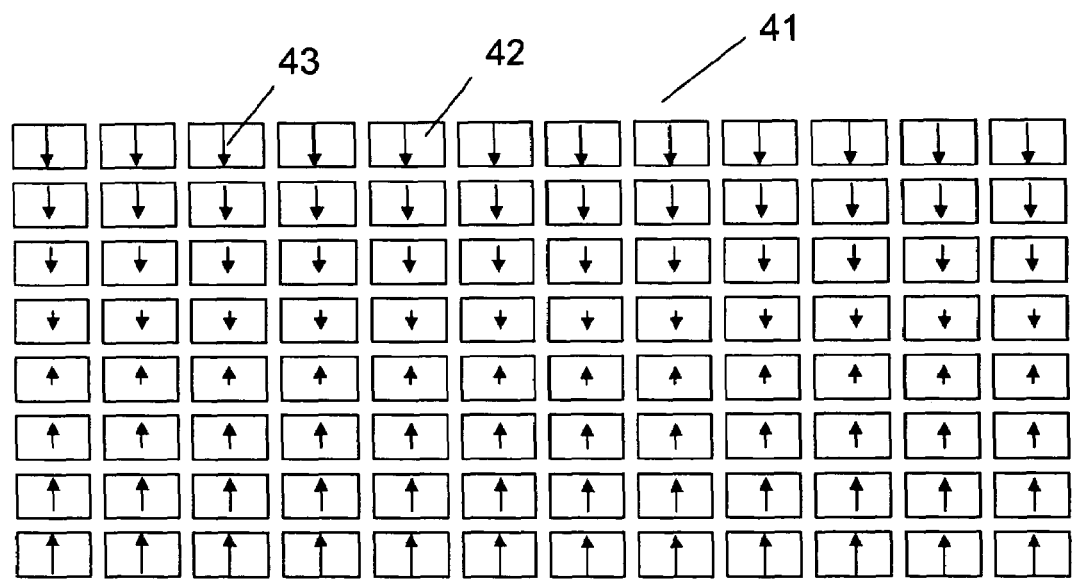
FIG. 4 is a schematic diagram showing the cylindrical lens comprising rectangular shape micromirrors.

FIG. 4 shows a variable focal length cylindrical lens 41 comprising rectangular micromirrors 42. The rotational amount of the micromirror is represented by length of arrow 43 and the rotational direction of the micromirror is represented by direction of arrow 43. An array comprising square or rectangle micromirrors 42 is appropriate to a symmetric lens about one axis of in-plane such as cylindrical lens 41. The micromirrors with same rotation are controlled by the same electrode or controlled by know semiconductor microelectronics technologies such as MOS or CMOS independently.

While the invention has been shown and described with reference to different embodiments thereof, it will be appreciated by those skills in the art that variations in form, detail, compositions and operation may be made without departing from the spirit and scope of the invention as defined by the accompanying claims.

What is claimed is:

1. A variable focal length lens comprising a plurality of micromirrors with one degree of freedom rotation, wherein the rotation of the micromirrors is controlled to change the focal length of the lens.

2. The lens of claim 1, wherein all of the micromirrors are arranged in a flat plane.

3. The lens of claim 1, wherein the micromirrors are arranged to form one or more concentric circles to form the lens.

4. The lens of claim 3, wherein the micromirrors on each of the concentric circles are controlled by one or more electrodes corresponding to the concentric circle.

5. The lens of claim 1, wherein the micromirrors are controlled independently.

6. The lens of claim 1, wherein the micromirror has a fan shape.

7. The lens of claim 1, wherein the micromirror has a rectangular shape.

8. The lens of claim 1, wherein the micromirror has a square shape.

9. The lens of claim 1, wherein the reflective surface of the micromirror is substantially flat.

10. The lens of claim 1, wherein the reflective surface of the micromirror has a curvature.

11. The lens of claim 10, wherein curvatures of the micromirrors are controlled.

12. The lens of claim 11, wherein the curvatures of the micromirrors are controlled by electrothermal force.

13. The lens of claim 11, wherein the curvatures of the micromirrors are controlled by electrostatic force.

14. The lens of claim 1, wherein the micromirrors are actuated by electrostatic force.

15. The lens of claim 1, wherein the micromirrors are actuated by electromagnetic force.

16. The lens of claim 1, wherein the micromirrors are actuated by electrostatic force and electromagnetic force.

17. The lens of claim 1, wherein a mechanical structure upholding the micromirrors and actuating components are located under the micromirrors.

18. The lens of claim 1, wherein a control circuitry is constructed under the micromirrors by using semiconductor microelectronics technologies.

19. The lens of claim 1, wherein the surface material of the micromirror is the one with high reflectivity.

20. The lens of claim 1, wherein the surface material of the micromirror is metal.

21. The lens of claim 1, wherein the surface material of the micromirror is metal compound.

22. The lens of claim 1, wherein the surface of the micromirror is made of multi-layered dielectric material.

* * * * *